(12) United States Patent
Ishida

(10) Patent No.: US 7,411,648 B2
(45) Date of Patent: Aug. 12, 2008

(54) LIQUID CRYSTAL DISPLAY PANEL WITH HEAT RADIATION PLATE

(75) Inventor: Hiroshi Ishida, Kanagawa (JP)

(73) Assignee: NEC LCD Technologies, Ltd, Kanagawa (JP)

( * ) Notice: Subject to any disclaimer, the term of this patent is extended or adjusted under 35 U.S.C. 154(b) by 275 days.

(21) Appl. No.: 10/963,787

(22) Filed: Oct. 14, 2004

(65) Prior Publication Data

US 2005/0083448 A1    Apr. 21, 2005

(30) Foreign Application Priority Data

Oct. 16, 2003    (JP) ............... 2003-356595

(51) Int. Cl.
  *G02F 1/1333*    (2006.01)
  *H05K 7/20*    (2006.01)
(52) U.S. Cl. .................. 349/161; 349/58; 349/67; 349/70; 349/149; 361/692; 361/697; 361/711
(58) Field of Classification Search ............ 349/161; 361/711
See application file for complete search history.

(56) References Cited

U.S. PATENT DOCUMENTS

| | | | |
|---|---|---|---|
| 5,299,038 A * | 3/1994 | Hamada et al. | 349/161 |
| 5,625,229 A | 4/1997 | Kojima et al. | |
| 6,407,781 B2 * | 6/2002 | Kitada | 349/58 |
| 6,714,410 B2 * | 3/2004 | Wellhofer | 361/687 |
| 7,327,416 B2 * | 2/2008 | Lee et al. | 349/65 |

FOREIGN PATENT DOCUMENTS

| | | |
|---|---|---|
| JP | 63-5321 A | 1/1988 |
| JP | S63-5321 A | 1/1988 |
| JP | S-63-20128 U | 2/1988 |
| JP | 5-2164 A | 1/1993 |
| JP | 7-210093 A | 8/1995 |
| JP | 7-212689 A | 8/1995 |
| JP | 2001-265235 A | 9/2001 |
| JP | 2002-244118 A | 8/2002 |
| JP | 2002-314900 A | 10/2002 |

* cited by examiner

*Primary Examiner*—Andrew Schechter
(74) *Attorney, Agent, or Firm*—Sughrue Mion, PLLC

(57) ABSTRACT

An auxiliary plate (10) is fixed to a rear plane of a housing for fixedly holding a lamp unit (6) having a plurality of lamps. In the auxiliary plate (10), a convex portion and a concave portion are combined. The convex portion has a space between the housing and itself, which is formed by protruding a sheet metal, and the concave portion contacts with the housing by denting the sheet metal. In the auxiliary plate 10, an area for mounting a board vulnerable to heat is formed with the convex portion and an air layer performs as heat insulation. The convex and concave portions are arrayed in a direction where heated air easily flows in another area. Thus, rigidity can be remarkably increased compared to a flat-shaped sheet metal, and heat generated by a backlight is effectively dissipated, as well as a temperature rise and an occurrence of a temperature gradient are suppressed.

13 Claims, 13 Drawing Sheets

Fig. 3A
Fig. 3B
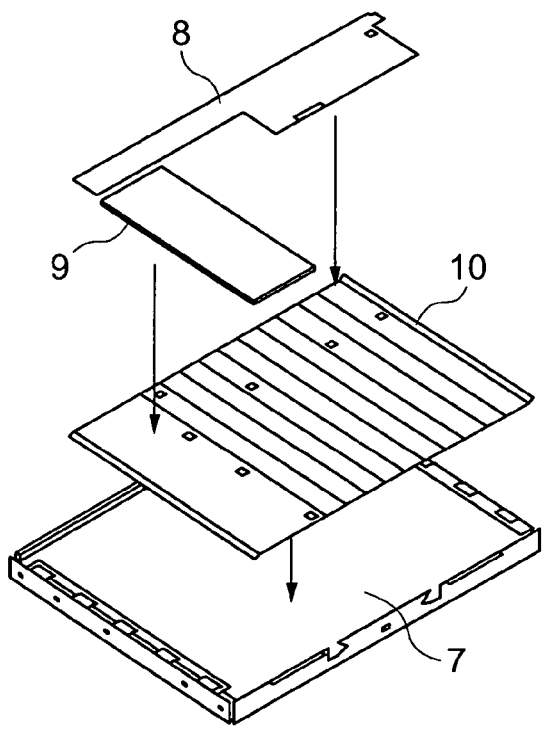
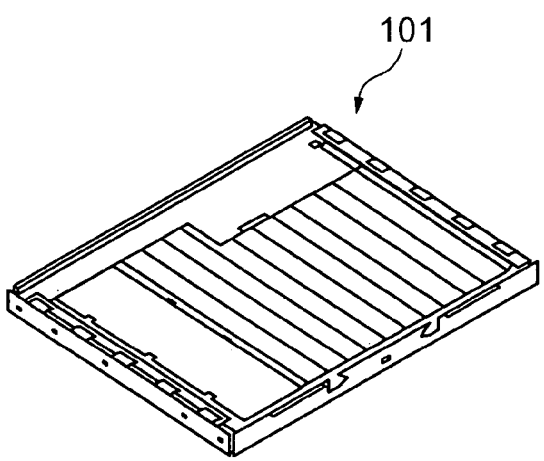

LIQUID CRYSTAL DISPLAY PANEL WITH HEAT RADIATION PLATE

BACKGROUND OF THE INVENTION

1. Field of the Invention

The present invention relates to a liquid crystal display panel, and more particularly, to a liquid crystal display panel with a direct backlight.

2. Description of the Prior Art

A liquid crystal display (LCD) panel has been utilized in a wide field of such as audio-visual (AV) machines, office automation (OA) machines, and portable terminal devices because of its features that it is fabricated to be thin, light in weight and low in power consumption. A backlight for the LCD panel is classified into a direct type, an edge light type, a surface light source type, and an external light type depending on its illumination style.

As shown in FIG. 1, for example, a conventional LCD panel 300 with a direct backlight comprises a lamp unit 6 for holding a plurality of lamps serving as a backlight source, an optical sheet 5 for converting backlight to uniform illumination light, and a liquid crystal panel 3 sandwiching liquid crystal between a pair of substrates opposed to each other as main constituent components.

Furthermore, the conventional LCD panel 300 with the direct backlight comprises a housing for fixedly holding these components thereto (including a front side shield 2, a rear side shield 7 serving also as a reflector for reflecting the backlight, and an internal chassis 4 for positioning the liquid crystal panel 3 in the constitution of FIG. 1); and a board (a circuit board 8 for driving the liquid crystal panel 3 and an inverter board 9 for driving a lamp) held and fixed to the housing (the rear side shield 7 in FIG. 1) as constituent components.

Herein, when the LCD 300 is used as a monitor of a personal computer, a panel size needs not to be made so large. Therefore, even in the foregoing constitution, rigidity of the LCD panel 300 can be maintained, and sufficient brightness can be obtained. However, when the LCD panel 300 is used as a television set, the panel size needs to be made large, for example, about 20-inch class panel. For this reason, a slight external force for the LCD panel 300 strains the LCD panel 300, and this strain causes display unevenness.

Furthermore, since the brightness needs to be increased when the LCD panel is used for the television set, the number of lamps of the backlight must be inevitably increased.

Therefore, when the number of the lamps is increased, temperature of the constituent components such as the liquid crystal panel 3, the circuit board 8, and the inverter board 9 rises due to heat generation of the backlight of the LCD panel 300, and thus its performance is degraded.

Accordingly, in order to increase the rigidity of the LCD panel 300, it is conceived to realize a strong structure of a housing such as a frame and a chassis for fixedly holding the liquid crystal panel 3, the lamp unit 6 and the like. However, in this case, the housing itself becomes large-sized, and it is impossible to achieve a narrower picture frame size of the LCD panel 300. Moreover, weight of the LCD panel 300 increases.

Furthermore, as a measure to hold down the temperature rise of the constituent components due to the heat generation of the backlight, there is a measure in which heat radiation means is provided in a structural body (for example, the rear side shield 7 in FIG. 1) for fixedly holding the lamps of the backlight or the like. This measure is disclosed in, for example, Japanese Patent Laid-Open No. Sho 63(1988)-5321.

Specifically, a LCD panel, which increases radiation efficiency by providing radiation fins on a reflector for reflecting light emitted from a fluorescent tube, is disclosed. In addition, in Japanese Patent Laid-Open No. Sho 63(1988)-20128, a LCD panel having a structure in which a supporting component is provided in both ends of a radiation plate and thereby a light source is fitted thereto, is disclosed. This LCD panel disclosed herein increases the radiation efficiency by providing radiation fins on a rear surface side of the radiation plate.

However, in the structures described in the foregoing official gazettes, a host of fins are provided in the structural body for fixedly holding the lamps of the backlight and in the radiation plate. Accordingly, it is natural that heat generated by the backlight can be discharged with using the radiation fins. However, the provision of the fins in the structural body and the radiation plate increases the cost. This is a serious problem for the LCD panel for which a lower price is required.

On the ground that the structural body and the radiation plate becomes heavier and larger due to the provision of the host of fins, a weight reduction and a reduction in thickness of the LCD panel are hindered. This problem becomes evident more significantly as a panel size becomes larger.

Furthermore, when the panel size becomes larger, there is a problem that air heated by the heat of the backlight remains above a panel surface, in addition to the problem of the temperature rise due to the above described heat generated by the backlight. A problem that the remaining of the air elevates temperature of peripheral components and a temperature gradient occurs in the panel surface is also raised.

For example, in a 20-inch class LCD panel in which power consumption of the backlight is about 50 W, a temperature at an upper portion of the panel becomes higher than that at a lower portion of the panel by about 10° C. Thus, when the panel size is large, not only heat radiation but also an evenness of a temperature distribution are required. However, since no consideration for the temperature gradient in the panel surface is taken in the above described official gazette, characteristics of thin film transistors, optical properties of liquid crystal, and the like change owing to the temperature gradient. Thereby, display unevenness occurs, leading to significant deterioration of display quality.

The present invention has been made invented in view of the foregoing problems, and a principal object of the present invention is to maintain the rigidity of a LCD panel even when a panel size becomes larger. Additionally, an object of the present invention is to provide a LCD panel comprising a direct backlight, which can achieve an increase in brightness, by suppressing rise in temperature of constituent components of a liquid crystal panel and a substrate due to heat generation of a backlight source as well as a temperature gradient in a panel surface.

SUMMARY OF THE INVENTION

A LCD panel of the present invention at least comprises a liquid crystal panel in which liquid crystal is sandwiched between substrates opposite to each other; a lamp unit in which a plurality of lamps for illuminating the liquid crystal panel are arrayed; and a plurality of housings for holding the liquid crystal panel and the lamp unit.

Furthermore, the LCD panel of the present invention comprises an auxiliary plate fixed to any of an internal plane and an external plane of the housing arranged on the lamp unit side. A convex portion, in which an air layer is formed between the housing and itself, and a concave portion contacting with the housings are repeatedly provided in the auxiliary plate, and the convex portion and the concave portion extend so that the air in the air layer flows from one side of the auxiliary plate to the other side thereof.

The LCD panel of the present invention further comprises at least an optical sheet for converting light of the lamps to uniform illumination light; a first housing located on the lamp unit side, a second housing located on the optical sheet side, the first and second housings holding the lamp unit and the optical sheet to be fitted to each other; and a third housing for holding the liquid crystal panel disposed on the second housing.

Additionally, the first housing serves as a reflector for reflecting the light of the lamps onto the liquid crystal panel.

Furthermore, the LCD panel of the present invention comprises the auxiliary plate, which is fixed to an external plane of the first housing and constituted of the convex portion in which the air layer is formed between the first housing and itself and the concave portion contacting with the first housing.

The auxiliary plate includes a first area composed of the convex portion on which at least one of a circuit board for driving the liquid crystal panel and an inverter board for driving the lamps is mounted, and a second area in which the convex portion and the concave portion are repeatedly provided, and the convex portion and the concave portion extend so that the air in the air layer flows from one side of the auxiliary plate to the other side thereof.

The LCD panel of the present invention further comprises at least an optical sheet for converting light of the lamps to uniform illumination light; a first housing located on the lamp unit side, a second housing located on the optical sheet side, the first and second housings holding the lamp unit and the optical sheet to be fitted to each other; and a third housing for holding the liquid crystal panel disposed on the second housing. The lamp unit includes a reflector for reflecting the light of the lamps onto the liquid crystal panel.

In addition, the auxiliary plate is fixed to an internal plane of the first housing. Furthermore, the convex portion, in which the air layer is formed between the first housing and itself, and the concave portion contacting with the first housing are repeatedly provided in the auxiliary plate, and the convex portion and the concave portion extend so that the air in the air layer flows from one side of the auxiliary plate to the other side thereof.

In the present invention, a structure, in which the convex and concave portions are formed so that an extending direction thereof points to approximately up-and-down direction in a state where the liquid crystal panel is set up, can be adopted. A structure, in which the convex and concave portions are formed so that an extending direction thereof is slanted with respect to one of a long side and a short side of the liquid crystal panel, can be also adopted. A structure, in which the convex and concave portions are formed so that the convex and concave portions are respectively bent at least at one portion, can be also adopted.

In the present invention, a structure, in which the convex and concave portions are formed so that the convex and concave portions change widths thereof in the extension, can be adopted.

As described above, in the present invention, the auxiliary plate is fixed to the housing for fixedly holding the lamp unit including the plurality of lamps serving as the backlight source in the LCD panel comprising a direct backlight.

By fixing the auxiliary plate to the housing, in which the convex portion formed by protruding a sheet metal and the concave portion formed by denting the sheet metal are formed at predetermined positions, the present invention can increase rigidity of the LCD panel remarkably compared to a case where a flat-shaped metal sheet is fixed to the housing:

An area for mounting components such as the inverter board and the circuit board vulnerable to heat is formed with the convex portion so that the heat insulation can be performed by the space between the housing and itself, and thereby the temperature rise of the components is suppressed. In another area, the concave portion, which contacts with the housing to absorb the heat of the housing, and the convex portion, in which an air vent for dissipating heated air is formed, are arrayed while being extended in a predetermined direction.

In the present invention, the heated air is dissipated to the outside effectively by the air vent, so that the heated air does not remain in the LCD panel. Thus, the temperature rises of the liquid crystal panel and the boards, and the temperature gradient in the surface of the liquid crystal panel can be suppressed. As a result, display unevenness due to strain of the LCD panel by slight external force never occurs, even when a panel size is larger. Additionally, since the number of the lamps can be increased, an increase in the brightness can be achieved.

BRIEF DESCRIPTION OF THE DRAWINGS

FIG. 3A depicts a stacking view of constituent components fitting an auxiliary plate thereto according to the first embodiment of the present invention.

FIG. 3B depicts a perspective view showing a fitting structure of the auxiliary plate shown in FIG. 3A.

DETAILED DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposes.

As described in the prior art, when the LCD panel is used for a television set, the panel size needs to be made larger. However, when the panel size becomes larger, there occurs the first problem that a slight external force for the LCD panel strains the LCD panel, and this strain causes display unevenness. When the number of the lamps of the backlight is increased in order to increase the brightness, there occurs the second problem that the temperature of the liquid crystal panel, the inverter board, the circuit board, and the like rises due to the heat generation of the backlight and thus its performance is degraded. In addition to this, there occurs the third problem that air heated by the heat of the backlight remains above a panel surface and the temperature above the surface panel further rises. Thereby, the temperature gradient in the panel surface occurs, leading to the deterioration of the display quality.

Accordingly, the present invention has been made so as to solve simultaneously the foregoing problems in such a manner that the rigidity of the LCD panel is increased, and heat generated by the backlight is efficiently radiated.

Specifically, the auxiliary plate is fixed to the rear side or the display side of the housing for fixedly holding the lamp unit including the plurality of lamps serving as the backlight source. In the auxiliary plate, the convex and concave portions are combined. The convex portion forms a space between the housing and itself by protruding the sheet metal, and the concave portion is formed in denting the sheet metal so as to contact with the housing and to absorb the heat.

In the auxiliary plate, an area for mounting a board vulnerable to heat is formed with the convex portion, and an air performs the heat insulation. In another area in the auxiliary plate, the convex and concave portions are arrayed to extend so that longitudinal directions thereof point to a direction where air easily flows (for example, up-and-down direction) in a state where the LCD panel is set up.

By configuring the LCD panel so as to the above mentioned structure, rigidity of the LCD panel can be increased remarkably compared to the flat-shaped sheet metal, and heat generated by the backlight is effectively dissipated, so that occurrences of a temperature rise and a temperature gradient can be suppressed.

First Embodiment

Figure 1:
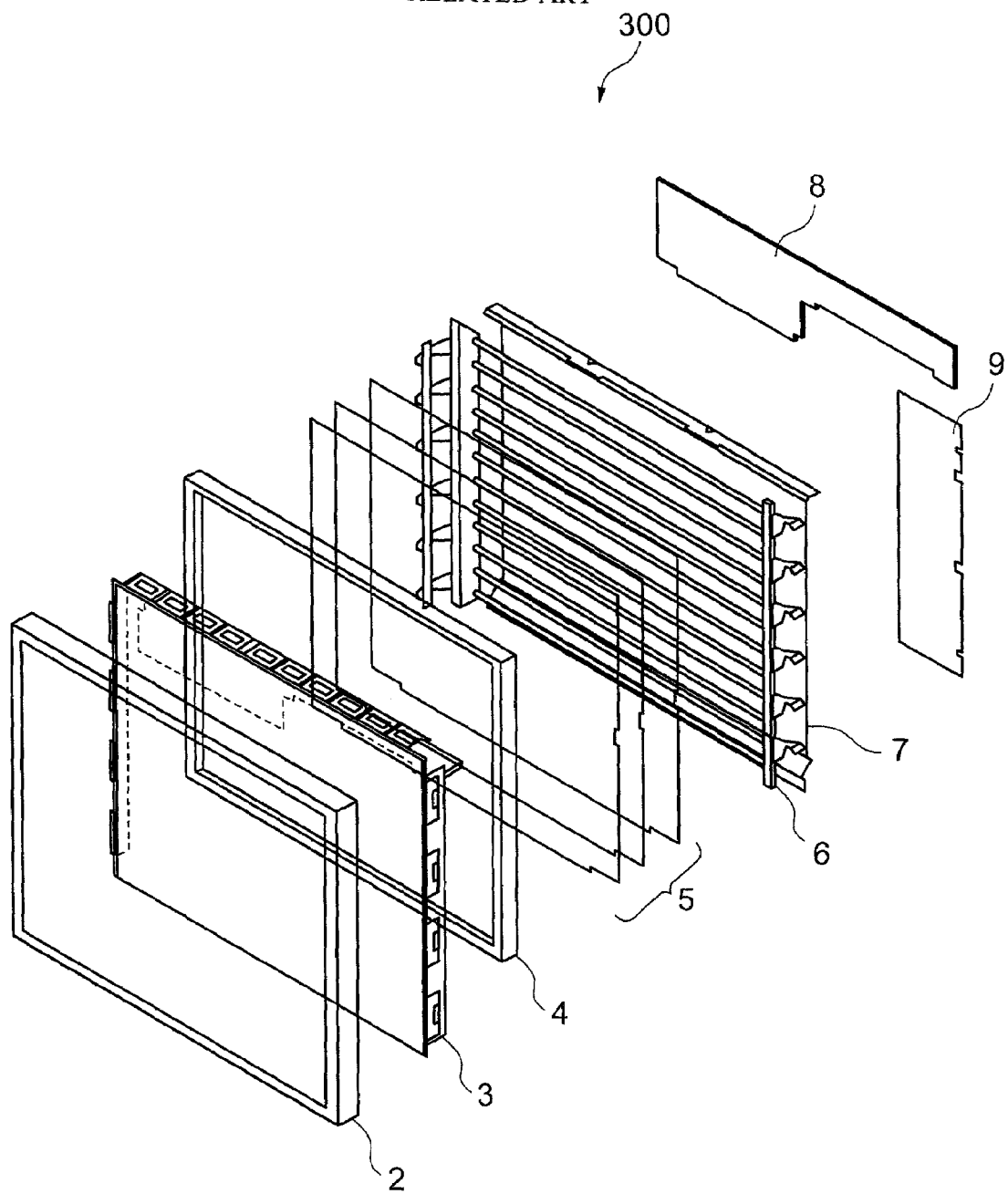
FIG. 1 depicts a stacking view of constituent components, which shows a structure of a conventional LCD panel.
Figure 2:
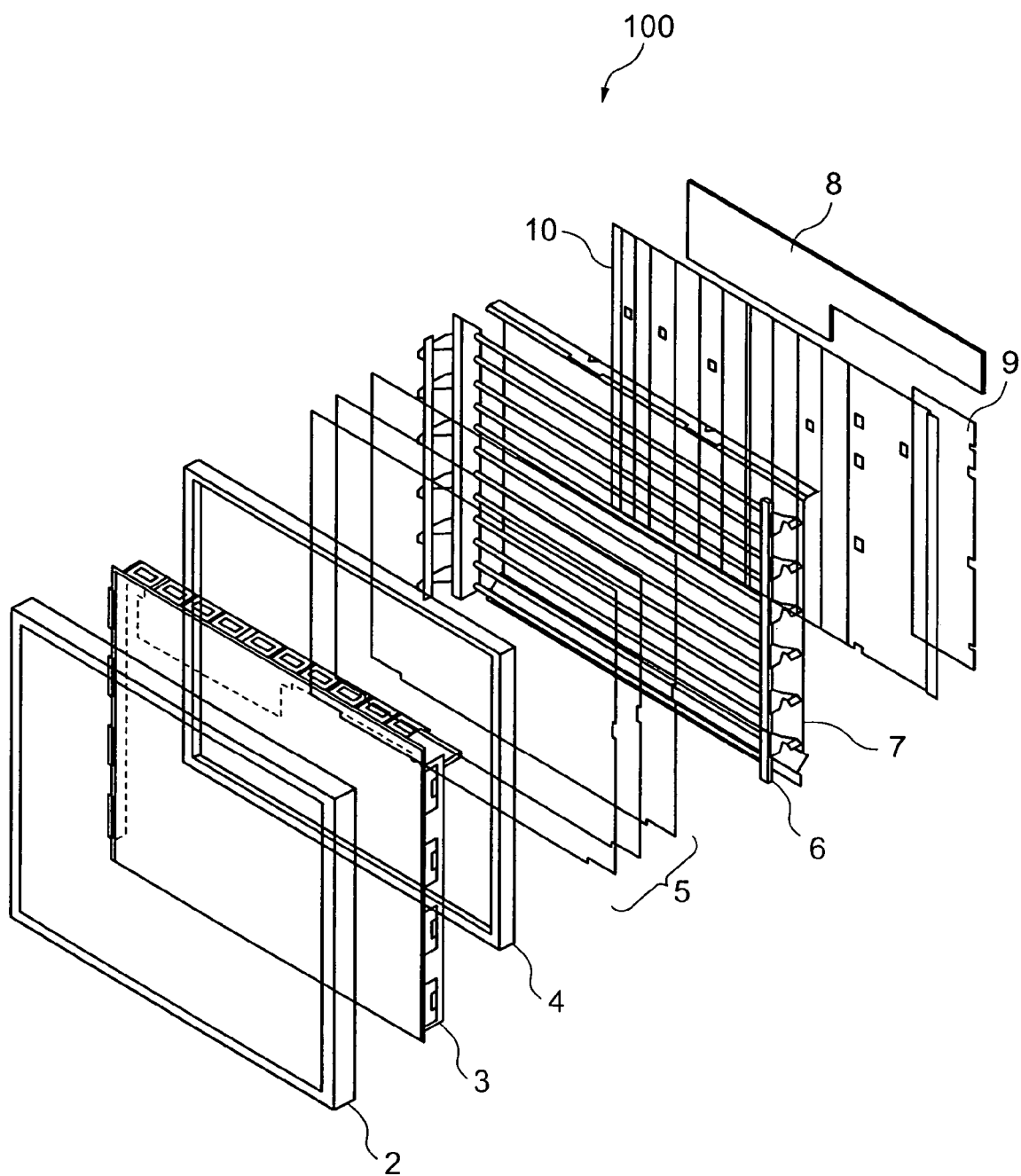
FIG. 2 depicts a stacking view of constituent components, which shows a structure of a LCD panel according to a first embodiment of the present invention.

In order to describe the above mentioned embodiment of the present invention more specifically, a LCD panel according to a first embodiment of the present invention will be described with reference to FIGS. 2 to 12B. FIG. 2 depicts a stacking view of components, which shows a structure of the LCD panel according to the first embodiment. FIG. 3A, FIG. 3B, FIG. 4A and FIG. 4B depict perspective views showing a fitting structure of an auxiliary plate. FIG. 5A, FIG. 5B, FIG. 12A and FIG. 12B depicts variations of the structure of the auxiliary plate.

First, a constitution of the LCD panel of this embodiment will be described with reference to the drawings. As shown in FIG. 2, in the LCD panel 100 of this embodiment, a liquid crystal panel 3, a lamp unit 6, and an optical sheet 5 are fixed by a housing including a rear side shield 7 serving as a reflector for reflecting the backlight to the liquid crystal panel 3 side, a front side shield 2, an internal chassis 4, and the like. The liquid crystal panel 3 is constituted in such a manner that liquid crystal is sealed in a gap between one insulating board and the other insulating board opposite thereto on which switching elements such as a thin film transistor are arranged in a matrix array. The lamp unit 6 holds a plurality of lamps serving as a backlight source of the liquid crystal panel 3. The optical sheet 5 includes a diffusion sheet, a polarization sheet, a lens sheet and the like, which convert backlight to uniform illumination light. Furthermore, as shown in FIG. 3A and FIG. 3B, an auxiliary plate 10 which is the feature of this embodiment is fixed to the rear plane (outer plane) of the rear side shield 7, by a spot welding or the like. Onto the auxiliary plate 10, boards including a circuit board 8 for driving the liquid crystal panel 3, and an inverter board 9 for driving a backlight, and the like are fixed at its predetermined areas.

Note that, in FIG. 2, the housing adopts the following structure. In the structure of the housing, a bottom plate on the rear plane (the rear side shield 7) side for fixedly holding the lamp unit 6; a resin frame (the internal chassis 4) located between the optical sheet 5 and the liquid crystal panel 3, the resin frame fitting the optical sheet 5 and the lamp unit 6 to the rear side shield 7 and fixedly holding them thereto as well as positioning the liquid crystal panel 3; and a metal frame (the front side shield 2) located on a display surface side, which fixedly holds the liquid crystal panel 3 onto the backlight, are provided.

It is satisfactory that the housing is constituted so that each of constituent components of the LCD panel 100 can be fixedly held. For example, a structure in which only the bottom plate (the rear side shield 7) on the rear surface side and the metal frame (the front side shield 2) on the display surface side thereof are used may be adopted. Furthermore, a constitution in which other structural bodies for fixedly holding each of constituent components are provided in addition to the internal chassis 4 may be adopted. Still furthermore, the LCD panel of this embodiment may be constituted in such a manner that each of the constituent components are assembled in the form of a module, for example, in such a manner that the optical sheet 5 and the lamp unit 6 are sandwiched by a housing, and thus a backlight module is fabricated.

Herein, in an edge light type in which a lamp is located on a side of the liquid crystal panel 3, since a resin plate for diffusing light to a backlight unit, or the like is inserted between the lamp and the backlight unit, rigidity of the LCD panel can be increased.

However, in a direct backlight, since the rear side shield 7 also functions as a reflector, a resin plate and the like cannot be inserted. In addition, when a panel size becomes large, the strength of the LCD panel cannot be kept. Furthermore, when the panel size becomes large, the number of lamps of the backlight must be increased in order to increase the brightness.

As a result, the problem has occurred that temperature of the liquid crystal panel 3, the circuit board 8, the inverter board 9, and the like rose due to heat generation of the backlight and thus performance was degraded. Furthermore, the problem has occurred that a temperature gradient in a surface of the liquid crystal panel 3 occurred, and display unevenness occurred, leading to deterioration of display quality.

To cope with these problems, a radiation plate composed of a host of fins has been heretofore provided on a rear surface side of a housing (the rear side shield 7 in the case of the structure in FIG. 2) located on the rear surface side of the lamp unit 6. However, though this fin structure exhibits a high radiation effect, its manufacturing cost is high, and its weight and thickness increase extensively. Accordingly, this has hindered a lower cost, a weight reduction and a reduction in thickness of the LCD panel 300.

Furthermore, in the conventional LCD panel 300, since a temperature gradient occurred due to a flow of air heated by heat of the backlight is not considered, it is impossible to prevent display unevenness effectively.

There has been the problem that the occurrence of the temperature gradient further more distorts each of the structural bodies of the LCD panel 300, and the display quality deteriorates.

Accordingly, in this embodiment, the rigidity of the LCD panel 100 is increased while suppressing the increase of the weight and thickness of the LCD panel to a minimum. Furthermore, in this embodiment, the temperature rise of the liquid crystal panel 3, the circuit board 8, and the inverter board 9 due to the heat generation of the backlight is suppressed, and the temperature gradient owing to the remaining of the heated air is suppressed.

Therefore, in this embodiment, a sheet metal made of a material such as aluminum, which is excellent in heat conductivity and workability, is worked. Accordingly, the auxiliary plate 10, in which specified projections and depressions are provided in predetermined positions, is formed. A structure, in which this auxiliary plate 10 is fixed to the rear plane of the rear side shield 7 by use of a spot welding or the like, is used.

Figure 5A:
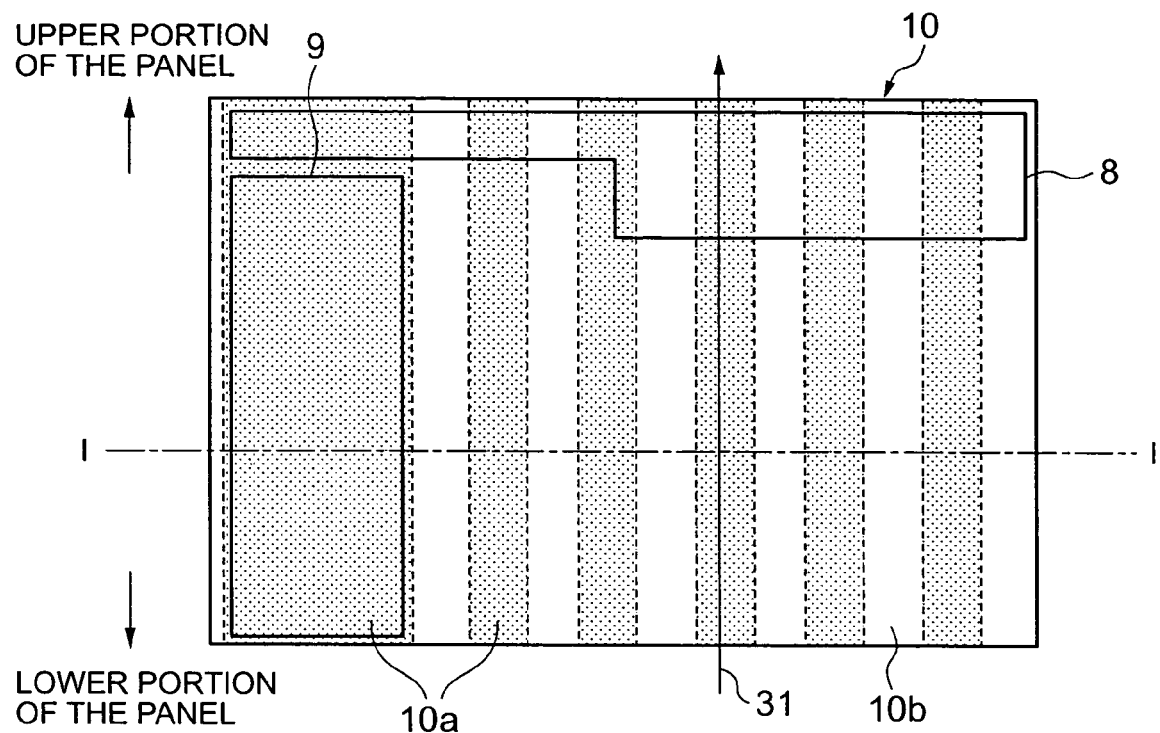
FIG. 5A depicts a plan view showing the auxiliary plate according to the first embodiment of the present invention.
Figure 5B:
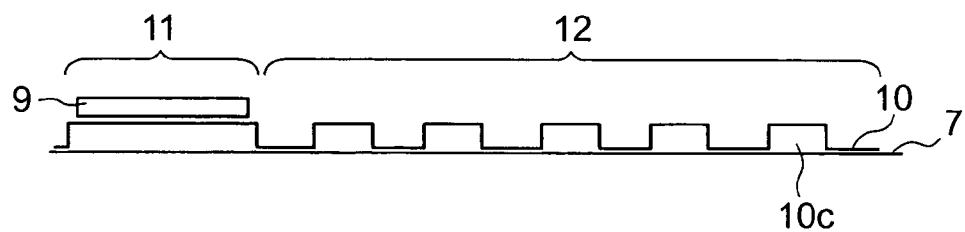
FIG. 5B depicts a schematic sectional view taken along the line I-I in the auxiliary plate according to the first embodiment of the present invention, which is shown in FIG. 5A.

The concrete structure of this auxiliary plate 10 will be described with reference to FIG. 5A and FIG. 5B. FIG. 5A is a plan view of the auxiliary plate 10 when viewed from the rear side thereof. FIG. 5B is a sectional view taken along the line I-I in the plan view. As shown in FIG. 5A and FIG. 5B, in this embodiment, protruding portions indicated by hatch patterns in the FIG. 5A, (hereinafter referred to as convex portions 10a), which form spaces between the auxiliary plate 10 and the rear side shield 7, are formed in the auxiliary plate 10.

In the auxiliary plate 10, recessed portions (hereinafter referred to as concave portions 10b), which contact the rear side shield 7 to absorb heat of the rear side shield 7 by heat conduction, are also formed.

An area for mounting a constituent component vulnerable to heat (in this case, the inverter board 9), which is referred to as a first area 11, is formed by the convex portion 10a so that a temperature rise of the inverter board 9 can be suppressed by controlling the heat influx from the rear side shield 7. Furthermore, another area, which is referred to as a second area 12, is formed in such a manner that the convex portions 10a and the concave portions 10b are arranged alternately in the lateral direction of the panel, the convex and concave portions 10a and 10b extending longitudinally while pointing to the directions of the panel. With such arrangement of the convex and concave portions 10a and 10b, heat of the rear side shield 7 can be absorbed quickly and air heated by heat can be dissipated to the outside quickly through an air vent 10c.

Note that in this specification, the shape of the auxiliary plate 10 is presented as a combination of the convex and concave portions 10a and 10b. With reference to the bottom of the concave portions 10b, the shape of the auxiliary plate 10 can be presented also as a combination of the convex portions 10a and the bottom plate. Furthermore, with reference to the top of the convex portions 10a, the shape of the auxiliary plate 10 can be presented also as a combination of the concave portions 10b and the top plate.

Figure 6:
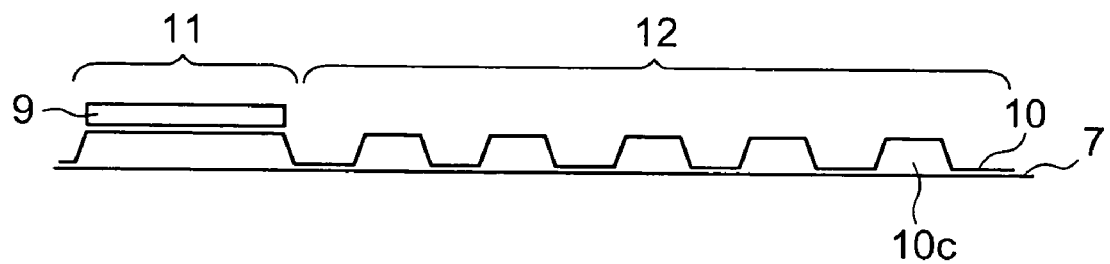
FIG. 6 depicts a sectional view showing another structure of the auxiliary plate according to the first embodiment of the present invention.
Figure 7:
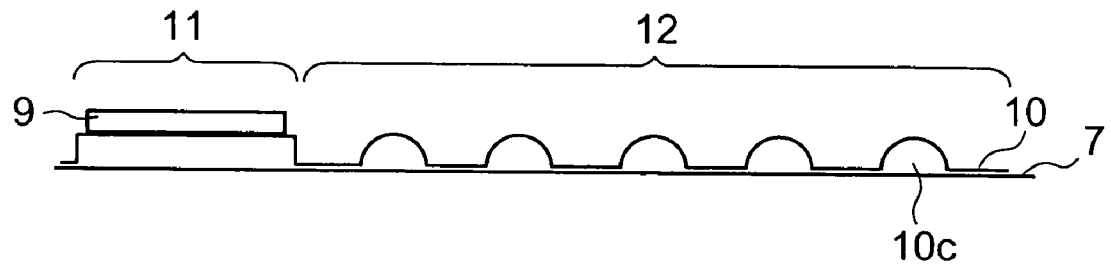
FIG. 7 depicts a sectional view showing still another structure of the auxiliary plate according to the first embodiment of the present invention.

A gap between the top of the convex portion 10a and the bottom of the concave portion 10b, which is a height of the unevenness, may be optional. The radiation effect can be more increased when the height of the unevenness is larger, as long as a reduction in thickness and a weight reduction are not hindered. The convex portions 10a and the concave portions 10b may not be rectangular, but at least one part of the convex and concave portions 10a and 10b may be trapezoid or arc-shaped as shown in FIG. 5 and FIG. 6. It is satisfactory that the convex portions 1a of the first area 11 have a size so that it can mount the board. Widths of the convex and concave portions 10a and 10b, interval therebetween, and the number of repetitions thereof of the second area 12 can be set arbitrarily in consideration for the radiation effect and the reinforcement effect. Furthermore, although the convex portion 10a and the concave portion 10b are arranged at regular intervals in the drawings, the width and the interval may vary depending on arrangement directions of the projections and depressions.

FIG. 5A and FIG. 5B depict a structure constituted on the assumption that the LCD panel 100 is placed laterally so that the long side thereof extends laterally. When the LCD panel 100 is placed laterally, air 31 heated by heat generation of the backlight flows from the lower portion of the LCD panel 100 to the upper portion thereof in FIG. 5A. Therefore, the arrangement direction of the convex and concave portions 10a and 10b is set so that the air vent 10c also extend vertically in accordance with the flow of the air 31.

On the other hand, in some case, the LCD panel 100 is placed vertically so that the short side thereof extends laterally. In this case, it is satisfactory that the convex and concave portions 10a and 10b are arranged so that the air vent 10c extends in the direction of the flow of the air 31 heated similarly.

It is satisfactory that a connection method of the auxiliary plate 10 and the rear side shield 7 to each other can include a structure in which the heat of the rear side shield 7 easily conducts to the auxiliary plate 10. In addition to a method for fixing the auxiliary plate 10 and the rear side shield 7 to each other by a spot welding, they may be screwed to each other directly or through rubber showing good heat conductivity.

They may be fixed to each other by use of adhesive showing good heat conductivity. In addition to these means, a structure in which the rear side shield 7 and the auxiliary plate 10 are fitted to each other may be used in combination with these means.

Note that the auxiliary plate 10 is used with the aim of suppressing the temperature rise of the LCD panel 100 as wells as of increasing the rigidity thereof. Therefore, for the reason that the rear side shield 7 and the auxiliary plate 10 should be firmly fixed to each other, it can be said that the spot welding is most suitable.

Figure 4A:
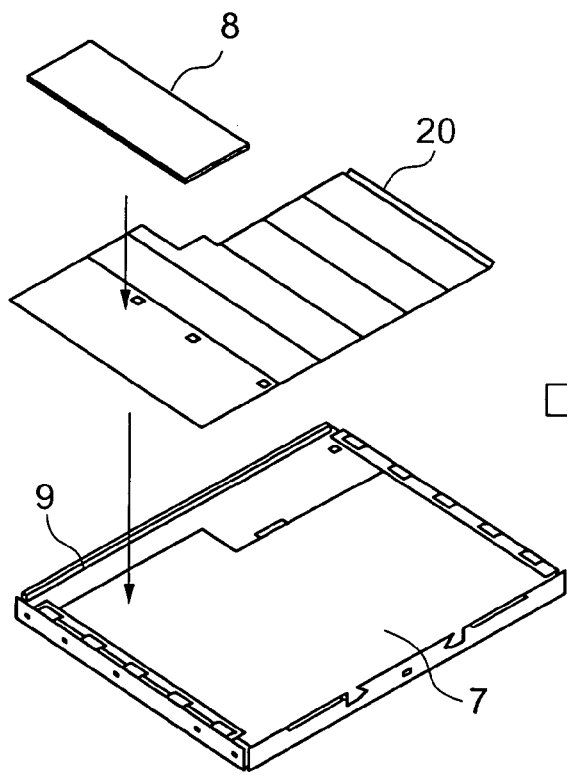
FIG. 4A depicts another stacking view of constituent components fitting the auxiliary plate thereto according to the first embodiment of the present invention.
Figure 4B:
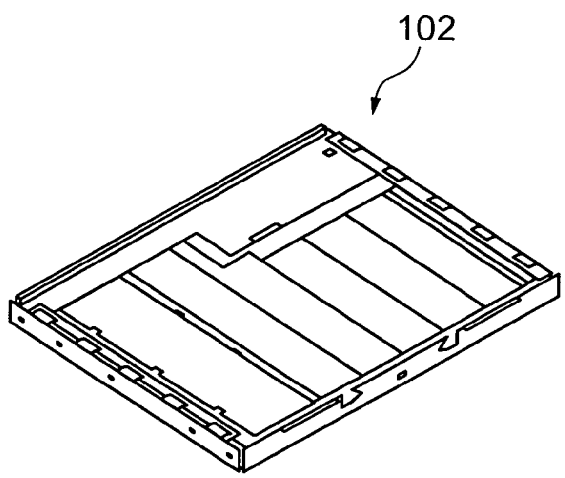
FIG. 4B depicts a perspective view showing another fitting structure of the auxiliary plate shown in FIG. 4A.

In FIG. 5A and FIG. 5B, a structure, in which the rectangular auxiliary plate 10 having a size approximately equal to that of the rectangular rear side shield 7 is provided, is adopted. However, as shown in FIG. 4A and FIG. 4B, depending on the structure of the LCD panel 102, the assembly task becomes easier in some cases when the board (in this case, the circuit board 8) is directly mounted on the rear side shield 7. In such cases, a shape of the auxiliary plate 20, such that the occurrence of a situation that the board is directly mounted on the rear side shield 7 is prevented from providing a notch in the auxiliary plate 20, may be adopted. The structure of the auxiliary plate 10 is not limited to the one of FIG. 3A, FIG. 3B, FIG. 4A and FIG. 4B. The auxiliary plate 10 can be formed to an optional shape as long as the auxiliary plate 10 can exhibit the radiation effect and the reinforcement effect.

Various variations of the structure of the auxiliary plate 10 of this embodiment are shown below. For simplicity of explanations, the case where the auxiliary plate 10 is rectangular, and only the inverter board 9 is mounted on the first area 11 will be described.

In FIG. 5A and FIG. 5B, the description was made on the assumption that the LCD panel 100 is placed laterally so that the long side thereof extends laterally. However, in recent years, many LCD panels are capable of switching between being placed laterally and being placed vertically. In this case, in the structure in which the convex portions 10a and the concave portions 10b extend vertically in the drawing (or laterally in the drawing), the heated air remains at a specific position of the LCD panel in any state where the LCD panel is placed vertically or laterally.

Figure 8A:
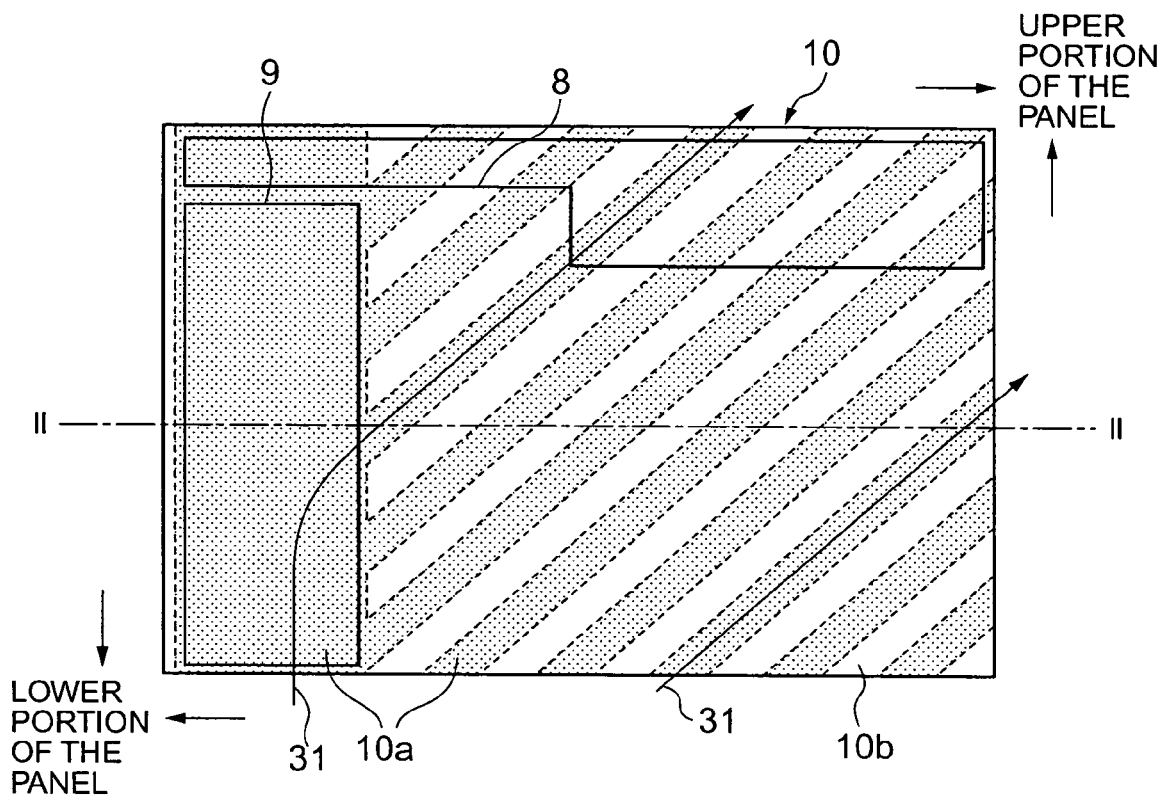
FIG. 8A depicts another plan view showing the auxiliary plate according to the first embodiment of the present invention.
Figure 8B:
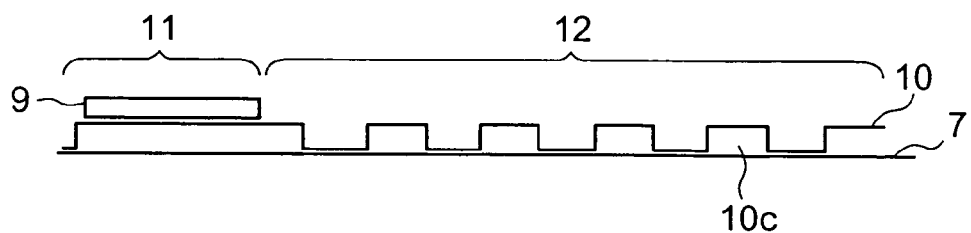
FIG. 8B depicts a schematic sectional view taken along the line II-II in another auxiliary plate according to the first embodiment of the present invention, which is shown in FIG. 8A.

To prevent the heated air from remaining at the specific position of the LCD panel, as shown in FIG. 8A and FIG. 8B, the heated air can be smoothly dissipated to the outside in anyway to place the LCD panel, by arranging the convex portions 10a and the concave portions 10b in an oblique direction in the drawings. Note that in the structure of FIG. 8A and FIG. 8B, the slanting angle of the convex and concave portions 10a and 10b can be set to an optional value such as 45 degrees, and the width thereof and the interval therebetween may be changed depending on the arrangement direction of the projection and depression. Furthermore, the first area 11 maybe arranged in any place of the panel, and take any shape. The first area 11 may be provided on the upper portion of FIG. 8A, and the first area 11 may be formed so as to be slanted in accordance with the slanting direction of the second area 12. Additionally, in FIG. 8A, the convex portions 10a of the first area 11 and the convex portions 10a of the second area 12 are connected to each other so that the air 31 flows. Furthermore, the first area 11 and the second area 12 may be formed separately.

Figure 9A:
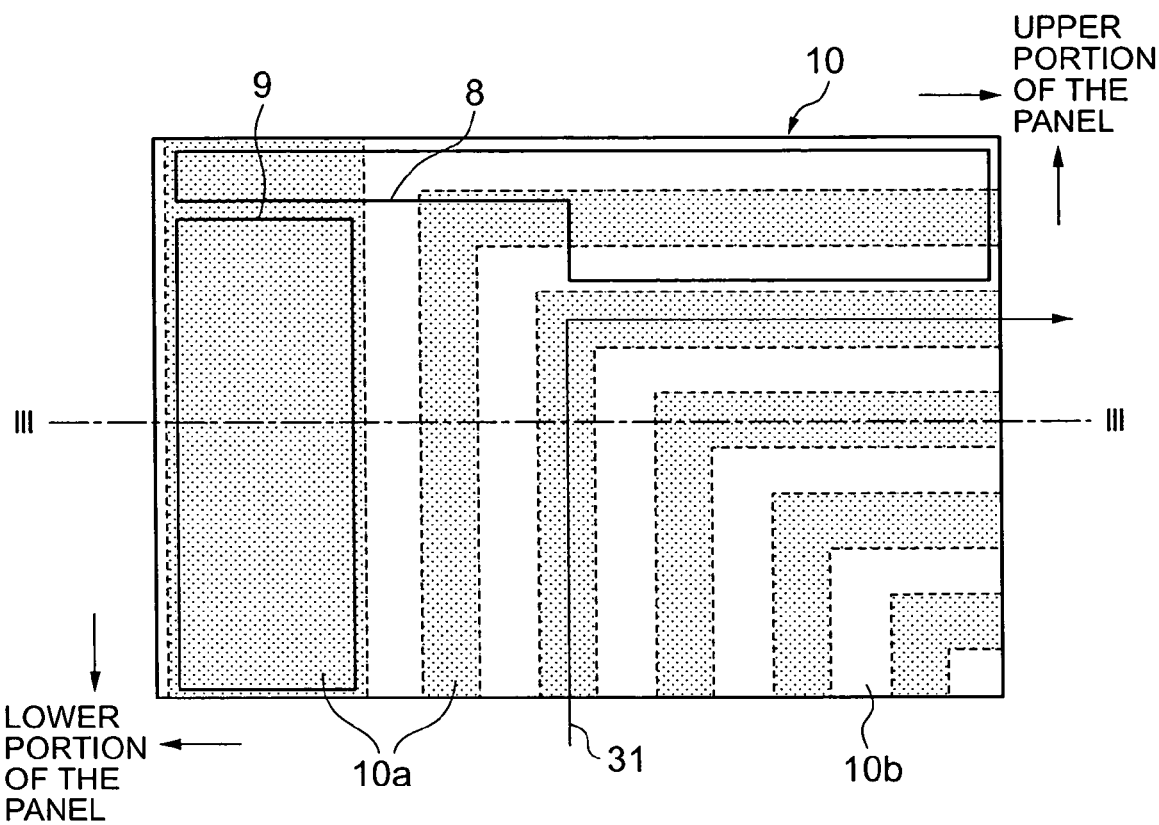
FIG. 9A depicts a plan view showing another structure of the auxiliary plate according to the first embodiment of the LCD panel of the present invention.
Figure 9B:
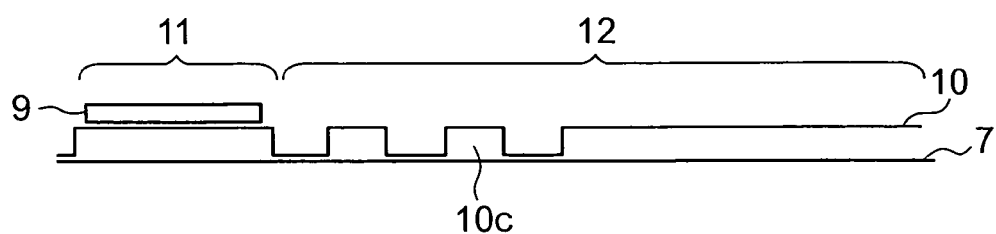
FIG. 9B depicts a sectional view schematically showing a section taken along the line III-III in FIG. 9A.

Instead of arranging the convex and concave portions 10a and 10b in the oblique direction, the convex portions 10a and concave portions 10b of the second area 12 may be also formed to be bent, as shown in FIG. 9A and FIG. 9B. In such structure, the heated air also can be dissipated to the outside whether the LCD panel is placed laterally or vertically.

Figure 10A:
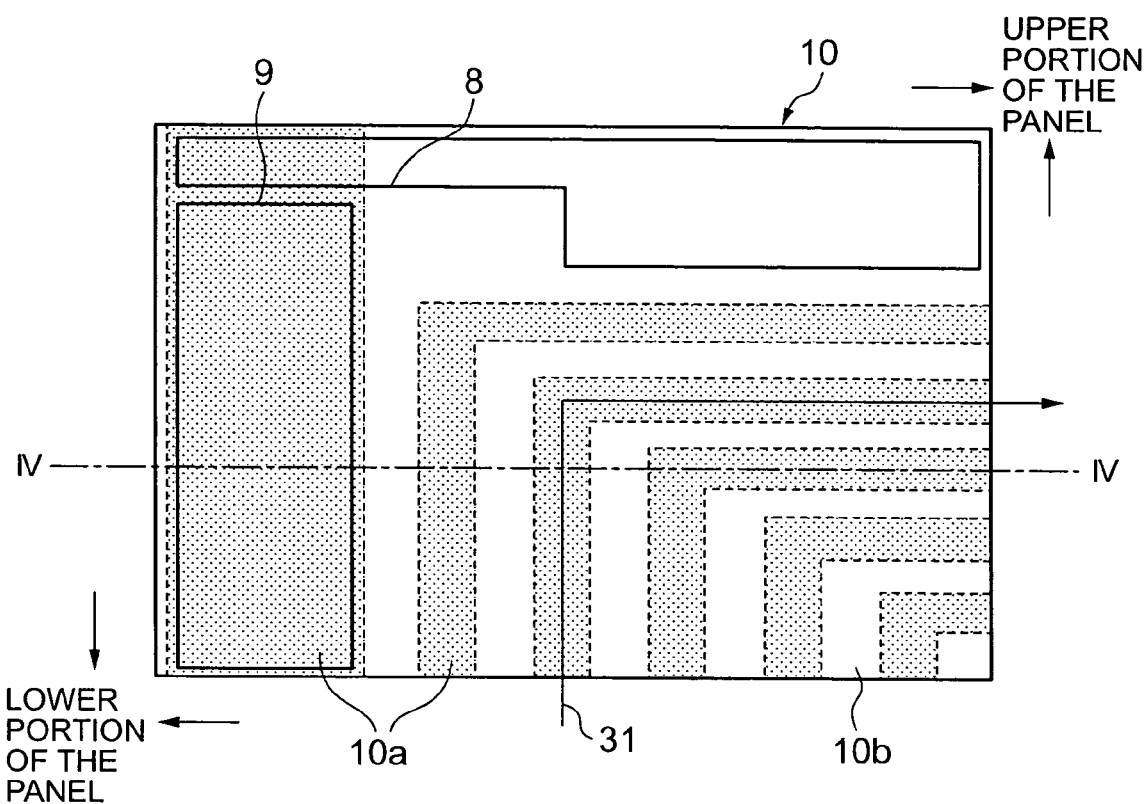
FIG. 10A depicts a plan view showing still another structure of the auxiliary plate according to the first embodiment of the LCD panel of the present invention.
Figure 10B:
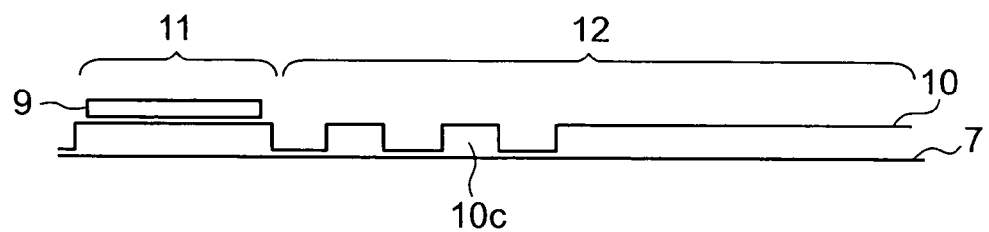
FIG. 10B depicts a sectional view schematically showing a section taken along the line IV-IV in FIG. 10A.

Note that in FIGS. 9A and FIG. 9B, though the orientations of the convex portions 10a and the concave portions 10b are made to be coincident with the long and short sides of the LCD panel 100, the structure of the LCD panel may be one in which the projection and depression extending in difference directions are connected. Specifically, a constitution in which at least one of the convex and concave portions 10a and 10b is oriented in an oblique direction, and a bent portion of at least one of the convex and concave portions 10a and 10b is rounded. Furthermore, a constitution in which the projection and depression extending in three or more directions are combined may be adopted. Furthermore, also in this structure, the widths of the convex and concave portions 10a and 10b, the interval therebetween, and the number of the repetition thereof of the second area 12 are optional. Thereby, the width and interval of the projection and depression may be changed depending on whether the LCD panel is placed laterally or vertically. Additionally, the width and interval of the convex and concave portions 10a and 10b may be changed depending on the arrangement direction of the projection and depression. Furthermore, in FIG. 9A and FIG. 9B, though the structure is one in which the inverter board 9 is mounted on the first area 11 on the auxiliary plate 10, the first area 11 may be formed so that both of the inverter board 9 and the circuit board 8 can be mounted in accordance with the shape of the second area 12, as shown in FIG. 10A and FIG. 10B.

In addition, in FIG. 5A, FIGS. 5B to 10A, and FIG. 10B, though the structure is one in which the convex and concave portions 10a and 10b extend so that their widths are constant in their longitudinal direction, the widths may be changed in their longitudinal direction.

Figure 11A:
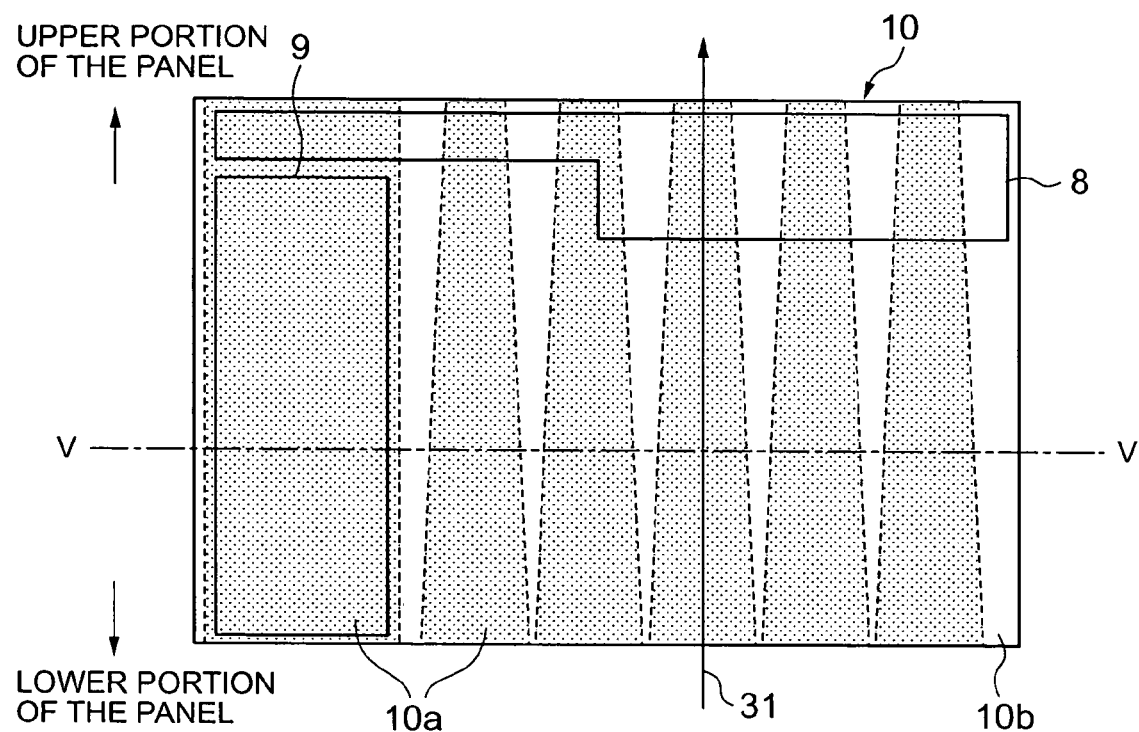
FIG. 11A depicts a plan view showing still another structure of the auxiliary plate according to the first embodiment of the present invention.
Figure 11B:
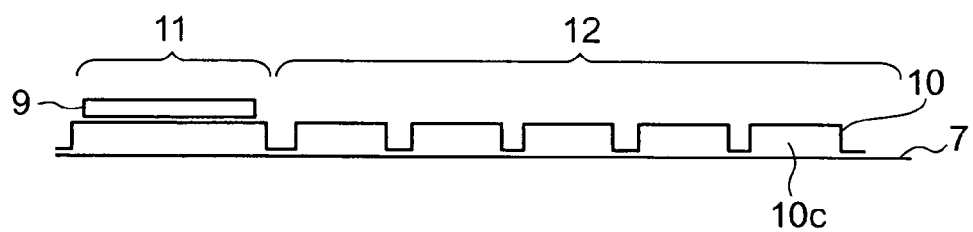
FIG. 11B depicts a schematic sectional view taken along the line V-V in the auxiliary plate according to the first embodiment of the present invention, which is shown in FIG. 11A.

For example, as shown in FIG. 11A and FIG. 11B, it is also possible to form the convex portions 10a to be tapered-shaped so that the convex portions 10a become gradually thinner upwardly (the concave portions 10b become thicker upwardly). The reason why such structure is adopted (the convex and concave portions 10a and 10b are formed to be tapered-shaped) is to control the quantity and velocity of flow of the heated air by the heat of the backlight.

For example, in the structure of FIG. 11A and FIG. 11B, since the sectional of the air vent 10c becomes gradually narrower upwardly, the velocity of flow of the air becomes faster. As a result, the radiation effect at the upper portion of the panel becomes more significant, and the effect to suppress the temperature rise of the upper portion of the panel can be expected. Furthermore, since the width of the concave portion 10b becomes gradually wider to the upper portion of the panel, a contact area of the concave portion 10b with the rear side shield 7 becomes larger. Therefore, for the reason that the heat at the upper portion of the panel is absorbed more effectively, the effect to suppress the temperature rise of the upper portion of the panel can be expected. Since easiness of the flow of the air depends on the cross-sectional area, the shape, and the like of the air vent 10C, it is preferable that a taper angle and the like are set in consideration of these circumstances. Furthermore, also in this structure, the widths of the convex and concave portions 10a and 10b, the interval therebetween, and the number of repartition thereof of the second area 12 are optional. Therefore, the width thereof, the interval therebetween and the taper angle thereof may be changed depending on the arrangement direction of the projection and depression. The slope of the taper may be reversed so that the air vent 10c becomes narrower downwardly and wider upwardly. Furthermore, the arrangement and shape of the first area 11 are optional. Therefore, the first area 11 may be provided at the upper portion of the drawing, and the first area 11 may be formed to be tapered-shaped as in the case of the second area 12.

Figure 12A:
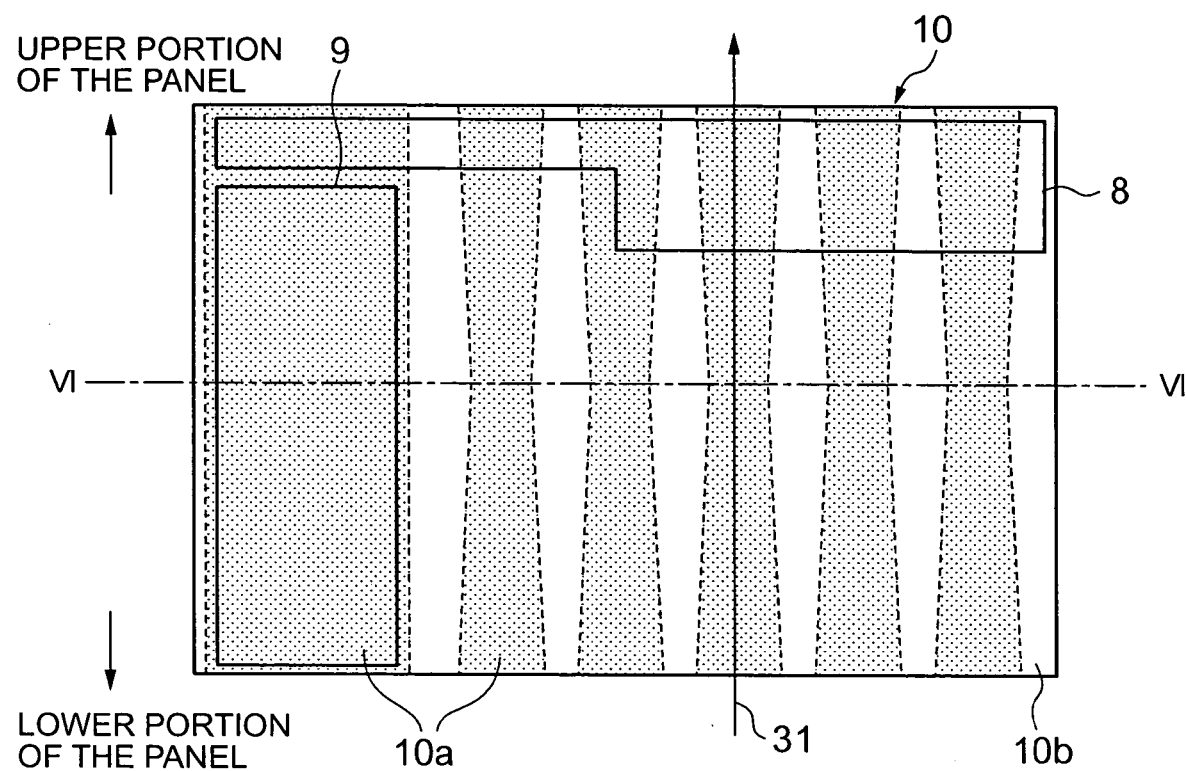
FIG. 12A depicts a plan view showing another structure of the auxiliary plate according to the first embodiment of the present invention.
Figure 12B:
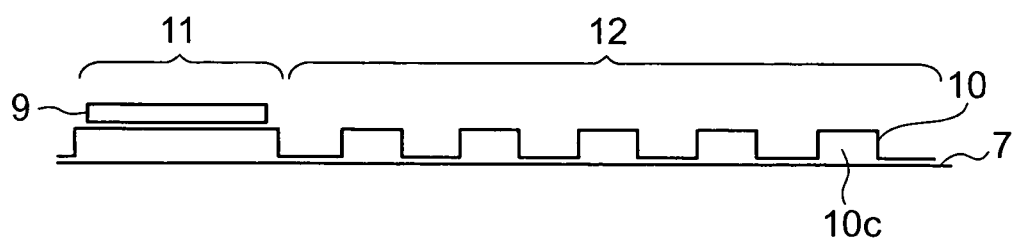
FIG. 12B depicts a schematic sectional view taken along the line VI-VI in the auxiliary plate according to the first embodiment of the present invention, which is shown in FIG. 12A.

In FIG. 11A and FIG. 11B, the width of the convex portion 10a (or the concave portion 10b) is formed to be gradually narrower (or wider) while trending toward the direction where the air flows. As shown in FIGS. 12A and 12B, however, the convex and concave portions 10a and 10b may be formed so that the region where the widths of the convex and concave portions 10a and 10b are narrower or wider is formed in the center portion of the auxiliary plate 10. In this structure, in consideration of the temperature distribution in the state where the auxiliary plate 10 is not provided, the width thereof is adjusted so that the radiation effect becomes higher at a region where the temperature is high. Thereby, the temperature distribution in the panel surface can be relaxed. For example, in a structure in which the air tends to remain above the panel surface, the temperature in the upper portion of the panel tends to become higher. In a structure in which the air is easily dissipated, the temperature at the center portion of the panel, in which the temperature rise due to the radiation is high, becomes higher in some cases.

In this case, if the air in the air vent 10c is made to flow faster in the center portion of the panel as shown in the drawing, an effect to suppress the temperature gradient in the panel surface can be expected. Also, in this structure, the width of the convex and concave portions 10a and 10c, the interval therebetween, and the number of repetition thereof of the second area 12 are optional. Therefore, the width thereof, the interval therebetween, and the taper angle thereof maybe changed depending on the arrangement direction of the projection and depression. Furthermore, the arrangement and shape of the first area 11 are optional. Therefore, the first area 11 may be provided in the upper portion of the drawing, and the first area 11 may be formed to be the same shape as that of the second area 12.

Furthermore, the structures of FIG. 5A, FIGS. 5B to 12A and FIG. 12B may be combined optionally. For example, the same effect can be obtained by combining the structures of FIG. 8A and FIG. 8B in which the convex and concave portions 10a and 10b are arranged obliquely with the structures of FIG. 11A and FIG. 11B in which the convex and concave portions 10a and 10b are formed to be tapered-shaped.

As described above, according to the LCD panel 100 of this embodiment, the auxiliary plate 10 in which the first and second areas 11 and 12 are formed by the convex and concave portions 10a and 10b is fixed to the housing (the rear side shield 7) for fixedly holding the lamp unit 6 by the spot welding or the like. Thereby the rigidity of the LCD panel 100 can be markedly increased compared to a case where an ordinary flat-shaped reinforcing plate is fixed thereto. By mounting the board (for example, the inverter board 9) vulnerable to heat on the first area 11, the temperature rise of the boards can be suppressed in the first area 11 by controlling the influx of the heat of the backlight. Additionally, in the second area 12, it is possible to absorb the heat of the housing by the concave portions 10b, and further it is possible to dissipate the heated air to the outside effectively by the air vent 10c formed between the convex portion 10a and the housing. Therefore, the temperature rises of the liquid crystal panel 3 and the boards can be suppressed. Furthermore, by considering the direction and shape of the air vent 10c so that the air therebetween easily flows, the heated airs dose not remain above the panel surface. Therefore, the temperature rise in the upper portion of the panel can be suppressed, and the temperature gradient in the panel surface can be suppressed. Furthermore, since the auxiliary plate 10 is formed by the bended sheet metal, a cost can be decreased. Since increases in weight and thickness are less in comparison with a fin structure, a weight reduction and a reduction in thickness are not hindered.

Second Embodiment

Figure 13:
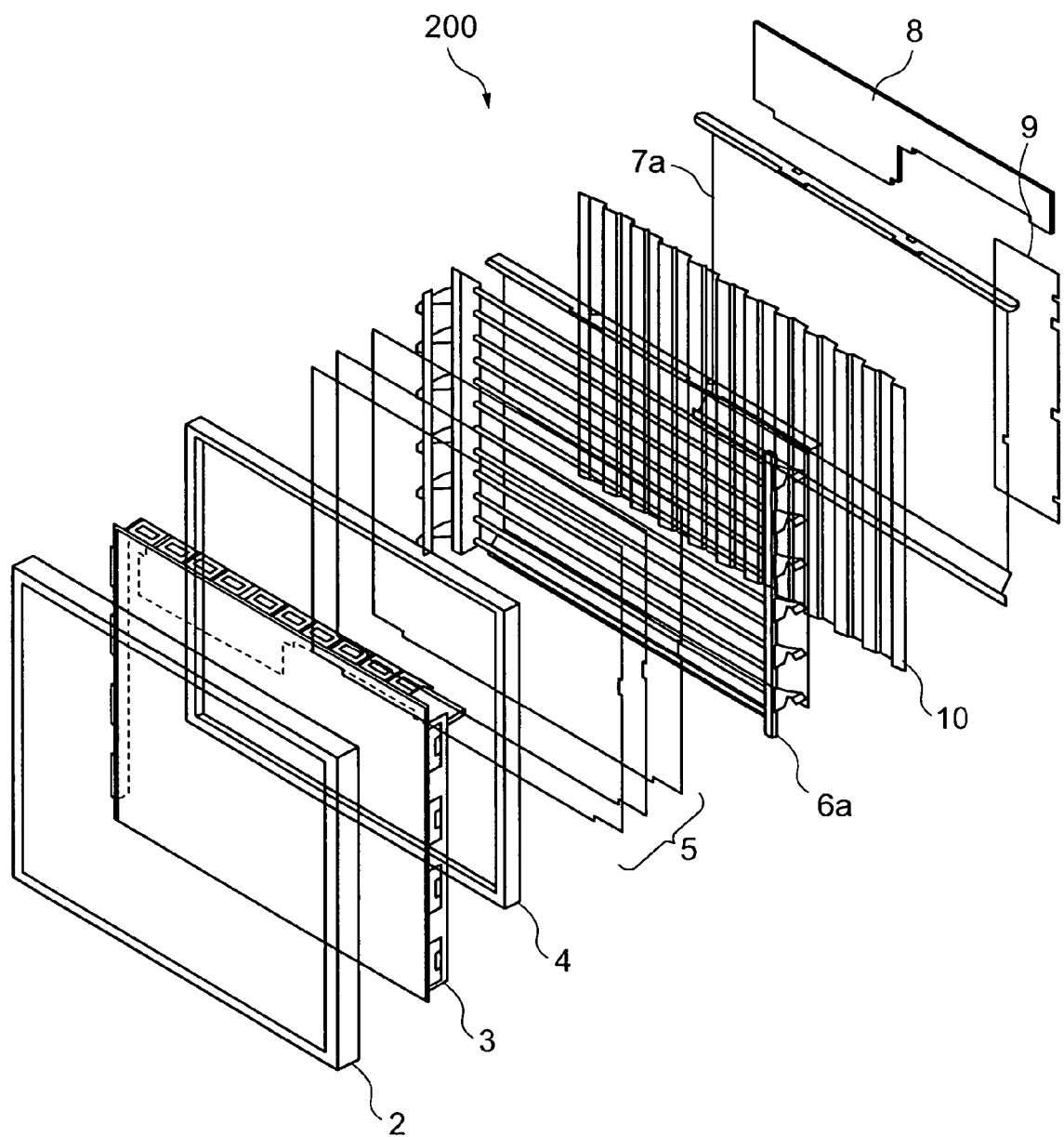
FIG. 13 depicts a stacking view of constituent components, which shows a structure of a LCD panel according to a second embodiment of the present invention.
Figure 14A:
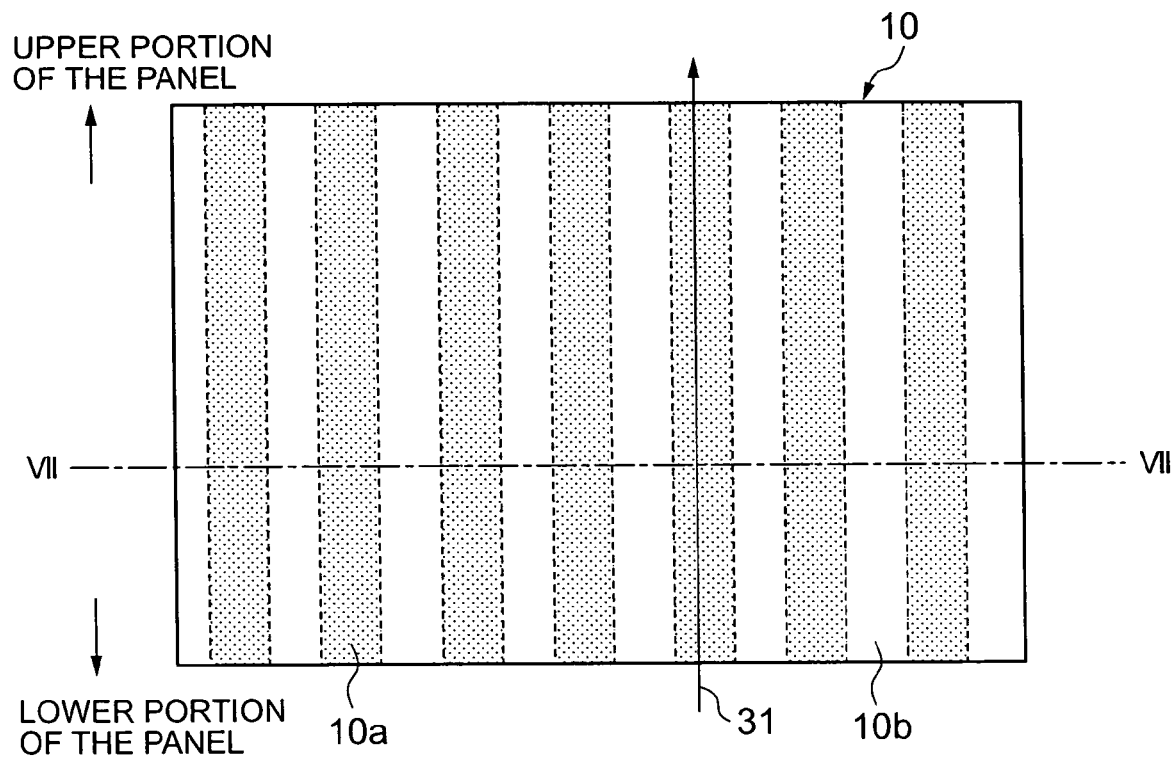
FIG. 14A depicts a plan view showing a structure of an auxiliary plate according to the second embodiment of the present invention.
Figure 14B:
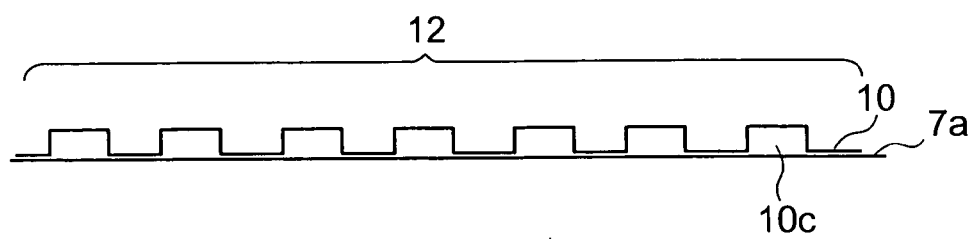
FIG. 14B depicts a schematic sectional view taken along the line VII-VII in the auxiliary plate according to the second embodiment of the present invention, which is shown in FIG. 14A.

Next, a LCD panel according to a second embodiment of the present invention will be described with reference to FIG. 13, FIG. 14A and FIG. 14B. FIG. 13 depicts a stacking view of constituent components, which shows a structure of the LCD panel according to the second embodiment. FIG. 14A depicts a plan view showing a structure of an auxiliary plate, and FIG. 14B depicts a sectional view taken along the line VII-VII in the auxiliary plate shown in FIG. 14A. In the first embodiment of the present invention, the auxiliary plate 10 is fixed to the rear plane of the rear side shield 7. The LCD panel 200 according to the second embodiment of the present invention has a feature in that the auxiliary plate 10 is fixed to a lamp side of the rear side shield 7.

Specifically, as shown in FIG. 13, the LCD panel 200 of this embodiment comprises a liquid crystal panel 3 configured by sealing liquid crystal in a gap between one insulating board and the other insulating board opposite thereto on which switching elements such as a thin film transistor are formed.

Furthermore, in the LCD panel 200 of this embodiment, a lamp unit 6a and an optical sheet 5 including a diffusion sheet, a polarization sheet and a lens sheet are fixed by a housing to each other. The lamp unit 6a holds a plurality of lamps serving as a backlight source of the liquid crystal panel 3 and includes a reflector for reflecting the backlight onto the liquid crystal panel 3 side, and the optical sheet 5 converts backlight to uniform illumination light. The housing includes a rear side sheet 7a having a display plane side onto which an auxiliary plate 10 which is a feature of this embodiment is fixed, a front side sheet 2 and an internal chassis 4. A circuit board 8 for driving the liquid crystal panel 3 and an inverter board 9, for driving the backlight are fixed at predetermined areas on the rear plane side of the rear side shield 7a.

Specifically, in the first embodiment, the auxiliary plate 10 is fixed to the rear plane side of the rear side shield 7 by the spot welding or the like so that the auxiliary plate 10 can be easily fitted to the existing LCD panel 100. However, in this structure, since the temperature of the rear side shield 7 itself serving as the reflector rises, it is impossible to suppress the temperature rises of the circuit board 8 and the inverter board 9 when the circuit board 8 and the inverter board 9 are directly mounted on the rear side shield 7.

Accordingly, in this embodiment, the reflector and the rear side shield are formed as separate units, and the auxiliary plate 10 is interposed therebetween, whereby heat is dissipated effectively by the auxiliary plate 10 and the temperature rise of the rear side shield 7a itself is suppressed.

In the case of this structure, there is a drawback that the number of constituent components increases. However, since the circuit board 8 and the inverter board 9 are mounted on the rear surface of the rear side shield 7a, a first area 11 for mounting the board on the auxiliary plate 10 needs not to be provided as shown in FIG. 14A and FIG. 14B. As a result, since the simple structure in which the convex portions 10a and the concave portions 10b are uniformly arranged can be adopted in this embodiment, manufacturing of the auxiliary plate 10 becomes easy, and a cost can be decreased. Furthermore, since the first area 11 needs not to be provided, the air vent 10c is never clogged with the first area 11 due to the arrangement of the board, and there is a merit that the heated air can be dissipated to the outside effectively.

The shapes of the convex and concave portions 10a and 10b, widths thereof, interval therebetween, and the number of repetitions thereof may be arbitrarily changed as in the case of the first embodiment. Furthermore, in the structure of this embodiment, since the auxiliary plate 10 is enclosed by the lamp unit 6a and the rear side shield 7a, in the structure of this embodiment it appears harder to dissipate the heat compared to the structure of the first embodiment. However, since the LCD panel 200 is practically further covered with an external resin case or the like, there is not so large difference between the LCD panels 100 and 200 of the first and second embodiments with respect to the heat dissipation. If a suitable ventilation port is previously provided in lower and upper planes of the resin case, the LCD panel 200 can easily dissipate the heated air to the outside. As shown in FIG. 13, though the LCD panel 200 is constituted to use the lamp unit 6a including the reflector, the projections and depressions of the auxiliary plate 10 may be formed in consideration of the arrangement of the lamps of the backlight (for example, the projections and depressions are formed in the same direction as that of the lamps and at the same intervals as those thereof), and the backlight may be reflected by the auxiliary plate 10. In this case, the reflector needs not to be provided in the lamp unit 6a.

As described above, also in the LCD panel 200 of this embodiment, the auxiliary plate 10 constituted of the convex portions 10a and the concave portions 10b is fixed to the display plane side of the housing (the rear side shield 7a) for fixedly holding the lamp unit 6a, by a spot welding or the like. Thus, rigidity of the LCD panel 200 can be remarkably increased compared to a case where an ordinary flat-shaped reinforcing plate is fixed thereto. Furthermore, the LCD panel 200 can absorb the heat of the housing by the concave portion 10b, and can dissipate the heated air to the outside effectively by the air vent 10c, which is formed between the convex portion 10a and the housing. Accordingly, the LCD panel 200 can suppress the temperature rises of the liquid crystal panel 3 and the boards. By considering the direction and shape of the air vent 10c so that the air therein easily flows, the heated air does not remain above the panel surface. Thus, the temperature rise in the upper portion of the panel can be suppressed, and the temperature gradient in the panel surface can be suppressed. Furthermore, since the auxiliary plate 10 is formed by the bended sheet metal, a cost can be decreased. Since increases in weight and thickness are less in comparison with a fin structure, a weight reduction and a reduction in thickness are not hindered.

Note that the present invention relates to the structure of the LCD panel in which the auxiliary plate for dissipating the heat generated by the backlight effectively and for increasing the rigidity of the LCD panel. Additionally, structures of constituent components other than the auxiliary plate, which are the liquid crystal panel 3, the lamp unit 6, the optical sheet 5, the housing and the like, are never limited. Furthermore, in the foregoing embodiments, the cases where the structures of the present invention are applied to the LCD panel in which the display plane is formed in one of the planes were described. However, the present invention is not limited to the foregoing embodiments, and the present invention can be similarly applied to a dual-sided type LCD panel in which liquid crystal panel are arranged on both planes thereof with a lamp unit sandwiched therebetween.

As described above, according to the LCD panel of the present invention comprising the direct backlight, the following first to fourth effects are exhibited.

Specifically, the first effect of the present invention is that the rigidity of the LCD panel can be increased, and the display unevenness due to the strain of the LCD panel can be suppressed even when the panel size becomes larger.

This is because the increase of the rigidity is achieved not by fixing a flat-shaped sheet metal to the housing for fixedly holding the lamp unit comprising the plurality of lamps serving as the backlight source, but by fixing the auxiliary plate having the three-dimensional structure, in which the convex and concave portions are arranged at the predetermined positions, to the housing.

In addition, the second effect of the present invention is that even when the number of the lamps of the backlight increases accompanied with an enlargement of the panel size, the temperature rises of the liquid crystal panel and the boards and the temperature gradient in the surface of the liquid crystal panel can be suppressed, resulting in achieving the increase of the brightness.

The reason is as follows. The auxiliary plates are provided in the two areas, and the area, in which the components such as the inverter board and the circuit board vulnerable to heat are mounted, is formed with the convex portion so that the heat insulation can be performed by the space between the convex portion and the structural body. Thus, the temperature rise of the boards can be suppressed. In another area, the concave portion, which contacts with the structural body to absorb the heat of the structural body, and the convex portion, in which the air vent for dissipating the heated air is formed, are arranged while being extended in a predetermined direction, and the heated air is dissipated to the outside effectively by the air vent, so that the heated air does not remain inside the LCD panel. Thus, the temperature rises of the liquid crystal panel and the boards and the temperature gradient in the surface of the liquid crystal panel can be suppressed.

Furthermore, the third effect of the present invention is that a weight reduction, a reduction in thickness, and the decreasing of the cost of the LCD panel can be achieved.

The reason is as follows. In the structure in which the fins are formed as in the case of the conventional LCD panel, weight and thickness increased by virtue of a host of fins, and making the fins cost. The auxiliary plate of the present invention is formed in working the flat-shaped metal sheet, and hence the auxiliary plate can be manufactured cheaply. Moreover, it is possible to achieve the weight reduction and the reduction in thickness of the LCD panel.

It is apparent that the present invention is not limited to the above embodiments, but may be modified and changed without departing from the scope and spirit of the invention.

What is claimed is:

1. A liquid crystal display panel, comprising:
   a liquid crystal panel in which liquid crystal is sandwiched between substrates opposite to each other;
   a lamp unit in which a plurality of lamps for illuminating the liquid crystal panel are arrayed behind the liquid crystal panel; and
   a plurality of housings for holding the liquid crystal panel and the lamp unit
   wherein an auxiliary plate fixed to an external plane of a housing arranged on the lamp unit side is provided, and
   a convex portion, in which an air layer is formed between the housing and itself, and a concave portion contacting with the housing are repeatedly provided in the auxiliary plate, and the convex portion and the concave portion extend so that the air in the air layer flows from one side of the auxiliary plate to an other side thereof;
   wherein a circuit board for driving the liquid crystal panel is mounted on an outer surface of the auxiliary plate.

2. The liquid crystal display panel according to claim 1,
wherein an optical sheet for converting light of the lamps to uniform illumination light, a first housing located on the lamp unit side, a second housing located on the optical sheet side, the first and second housings holding the lamp unit and the optical sheet to be fitted to each other, and a third housing for holding the liquid crystal panel disposed on the second housing are at least provided;

wherein the first housing serves as a reflector for reflecting the light of the lamps onto the liquid crystal panel, and the auxiliary plate is provided, which is fixed to an external plane of the first housing and constituted of the convex portion in which the air layer is formed between the first housing and itself and the concave portion contacting with the first housing; and wherein the auxiliary plate includes a first area composed of the convex portion on which at least one of a circuit board for driving the liquid crystal panel and an inverter board for driving the lamps is mounted, and a second area in which the convex and concave portions are repeatedly provided, and the convex and concave portions extend so that the air in the air layer flows from one side of the auxiliary plate to the other side thereof.

3. The liquid crystal display panel according to claim 2, wherein the convex and concave portions are formed so that an extending direction thereof points to approximately up-and-down direction in a state where the liquid crystal panel is set up.

4. The liquid crystal display panel according to claim 3, wherein the convex and concave portions are formed so that the convex and concave portions change widths thereof in the extending direction.

5. The liquid crystal display panel according to claim 2, wherein the convex and concave portions are formed so that an extending direction thereof is slanted with respect to one of a long side and a short side of the liquid crystal panel.

6. The liquid crystal display panel according to claim 2, wherein the convex and concave portions are formed so that the convex and concave portions are respectively bent at least at one portion.

7. The liquid crystal display panel according to claim 2, wherein the auxiliary plate has upper, lower and center portions, wherein the convex and concave portions are formed so that at the center portion of the auxiliary plate a width of the convex portion is narrower than a width of the convex portion at at least one of the upper and lower portions of the auxiliary plate and a width of the concave portion is wider than a width of the concave portions at at least one of the upper and lower portions of the auxiliary plate.

8. The liquid crystal display panel according to claim 1, wherein the convex and concave portions are formed so that an extending direction thereof points to approximately up-and-down direction in a state where the liquid crystal panel is set up.

9. The liquid crystal display panel according to claim 8, wherein the convex and concave portions are formed so that the convex and concave portions change widths thereof in the extending direction.

10. The liquid crystal display panel according to claim 1, wherein the convex and concave portions are formed so that an extending direction thereof is slanted with respect to one of a long side and a short side of the liquid crystal panel.

11. The liquid crystal display panel according to claim 1, wherein the convex and concave portions are formed so that the convex and concave portions are respectively bent at least at one portion.

12. The liquid crystal display panel according to claim 1, wherein the auxiliary plate has upper, lower and center portions, wherein the convex and concave portions are formed so that at the center portion of the auxiliary plate a width of the convex portion is narrower than a width of the convex portion at at least one of the upper and lower portions of the auxiliary plate and a width of the concave portion is wider than a width of the concave portions at at least one of the upper and lower portions of the auxiliary plate.

13. The liquid crystal display panel according to claim 1, wherein the circuit board for driving the liquid crystal panel is mounted on the outer surface of convex portion of the auxiliary plate.

* * * * *